United States Patent Office 2,962,519
Patented Nov. 29, 1960

2,962,519

PHOSPHATES OF 2,3-DIMETHOXY-5-METHYL HYDROQUINONES

Karl A. Folkers, Plainfield, and Carl H. Hoffman, Scotch Plains, N.J., assignors to Merck & Co., Inc., Rahway, N.J., a corporation of New Jersey No Drawing. Filed Sept. 11, 1958, Ser. No. 760,290

6 Claims. (Cl. 260—461)

This invention concerns the phosphate ester derivatives of hydroquinones, in particular the 1- and 4-phosphates of certain 2,3-dimethoxy-5-methyl-benzo-hydroquinones which are also substituted in the 6-position with an alkenyl radical, which is composed of one to ten isoprenoid units serially attached ($C_5$ to $C_{50}$). The invention also involves the methods of producing these compounds.

The compounds of the invention may be represented by the structure:

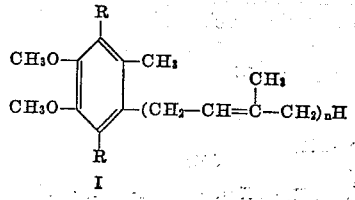

I in which at least one of the radicals R is —OPO(OH)$_2$ (orthophosphate) and the other may be an hydroxyl or orthophosphate, and $n$ is an integer from one to ten.

A parent quinone of this type has been found to occur in normal tissue; in particular, one of the general structure II, where $n=10$, has been isolated from beef heart muscle (mitochondria):

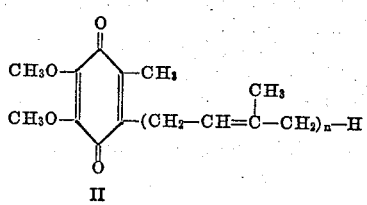

II by F. L. Crane, Y. Hatefi, R. L. Lester, and C. Widmer [Biochim. Biophys. Acta, 25, 220 (1957)]. This compound is known as Q-275 or as Coenzyme Q-10. Other variants have been isolated wherein $n=5$ to 9 inclusive and they are known as Q-5 to Q-9, respectively. This entire group of compounds is referred to as "Coenzyme Q's."

To prepare to carry out our invention, the selected benzoquinone, in which $n$ is 5 to 10, and which may be isolated from a living source, must first be reduced to the corresponding hydroquinone by a conventional reductive step which may be carried out by one of a number of means, specifically, sodium hydrosulfite, zinc and acid, catalytic hydrogenation, one of the metal hydrides, or sulfur dioxide, all of which are the usual means in the art for producing hydroquinones from quinones. This is indicated by the reaction:

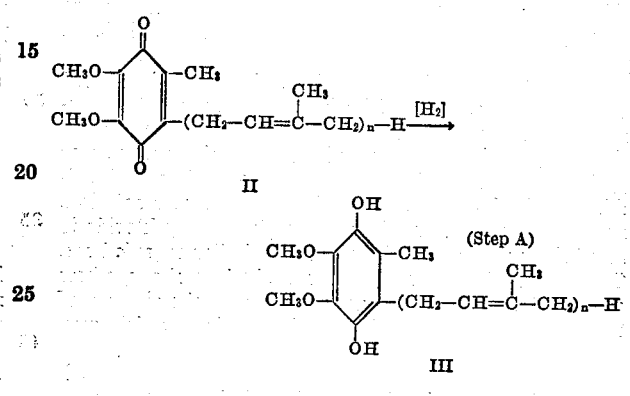

in which $n$ is an integer from 5 to 10, the formulae representing Coenzyme Q-5 to Q-10 respectively which may be prepared from living sources.

The hydroquinones, useful as starting materials for producing the compound I of this invention, may as well be produced by synthetic means. The production of these compounds, having the structure III in which $n$ is an integer from 1 to 10 is described and claimed in a patent application filed on August 25, 1958, in the name of C. H. Shunk et al. and entitled "2,3-dimethoxy Benzoquinones (with 1 to 10 Unsaturated Side Chain Groups)." The disclosure of that application is intended to be incorporated into the present application, by reference. That application specifically discloses the production of:

2,3 - dimethoxy - 5 - methyl - 6 - (3' - methyl - 2' - butenyl)-hydroquinone.
2,3-dimethoxy-5-methyl-6-geranylhydroquinone.
2,3-dimethoxy-5-methyl-6-farnesylhydroquinone.
2,3 - dimethoxy - 5 - methyl - 6 - (3',7',11',15' - tetramethyl-2',6',10',14'-hexadecatetraenyl)-hydroquinone.
2,3 - dimethoxy - 5 - methyl - 6 - (3',7',11',15',19' - pentamethyl -2',6',10',14,18' - eicosapentaenyl) - hydroquinone.
2,3 - dimethoxy - 5 - methyl - 6 - (3'7',11',15',19',23',-27',31' - octamethyl - 2',6',10',14',18',22',26',30' - dotriacontaoctaenyl)-hydroquinone (II, $n=8$).

The hydroquinone, whether it is obtained by preparation from a living source or is obtained by the procedure of the above mentioned application, is then phosphorylated by the following step of our invention:

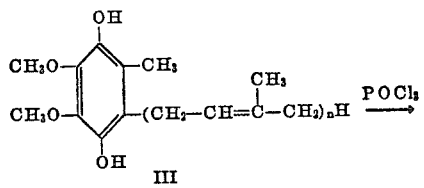

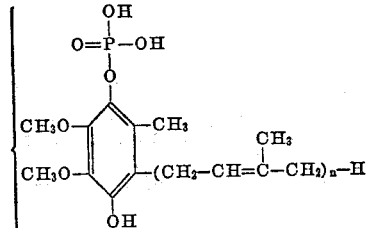 and 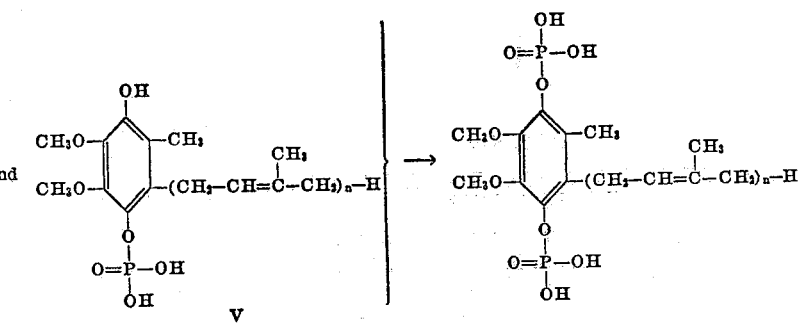

The most readily available and useful derivative of phosphoric acid which may be used is phosphorus oxychloride, although a number of other derivatives such as dibenzylphosphochloridate may be used in indirect processes.

The phosphorylation step of our invention is carried out by treating the requisite hydroquinone, most preferably, but not necessarily, in an inert atmosphere such as rigorously purified nitrogen with an organic base such as pyridine, quinoline, isoquinoline, or any of several collidines, mixed or pure, or the like, to produce a solution, and adding a solution of pure phosphorus oxychloride in an additional quantity of the same or similar organic base. Other inert solvents such as benzene, hydrocarbons, ethers and the like may be used as diluents after the manner of the art. After a suitable reaction period, which may vary from ten minutes to ten hours, depending on the batch size and the heat evolved, the reaction mixture is processed for isolation by suitable techniques. The reaction temperature is preferably kept in the range of $-30°$ C. to $+50°$ C., although higher temperatures may be tolerated. The use of lower boiling organic bases is readily seen to be advantageous, in that they are easily removed subsequently; the usual technique is application of vacuum to evaporate all excess reagents and solvents, separation of the product by acidification and extraction with solvents, and evaporation of the solvent which leaves the desired product, the 1,4-diphosphate ester of a 1,4-dihydroxy - 2,3 - dimethoxy - 5 - methyl - 6 - alkenyl - benzene wherein the side chain substituted at the 6 position consists of one to ten isoprenoid units as hereinbefore illustrated. A specific compound is the diphosphate ester of the hydroquinone of Coenzyme Q-10, wherein the side chain at position 6 has ten isoprenoid units. The preparations ordinarily contain substantially the diphosphate admixed with minor or trace amounts of the monophosphates, such as the 1-phosphate of a 1,4-dihydroxy-2,3-dimethoxy-5-methyl-6-(alkenyl)benzene and the 4-phosphate of a 1,4-dihydroxy-2,3-dimethoxy-5-methyl-6-(alkenyl)-benzene, which are formed in the course of first stages of the reaction hereinbefore illustrated and may be found remaining. If desired, they may be separated by the usual purification procedures on resin columns designed to elute each entity separately, or by the usual means of fractional acidification and solvent partition.

The invention includes the salts of the compounds represented by I, such as the alkali and alkaline earth salts.

These compounds, especially in the form of their salts, can form very stable emulsions with aqueous and organic solvent combinations, and can be used as emulsifiers of certain pharmaceuticals designated for suspension in aqueous vehicles.

The following examples are intended to be illustrative, but not restrictive, of our invention.

The following terminology is employed in naming the compounds produced by the examples. The compounds wherein the side chain at position 6 of the nucleus is composed of one or two isoprenoid units will be named by the usual system, viz.:

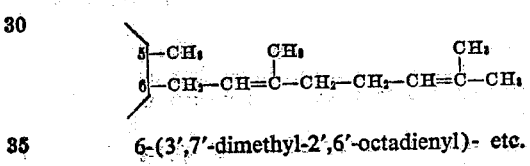

6-(3',7'-dimethyl-2',6'-octadienyl)- etc.

Because the examples with longer side chains result in names which are unnecessarily long, it is preferable to use a system wherein Greek prefixes, signifying the repeating radical and number thereof attached serially "head to tail," are employed, viz.:

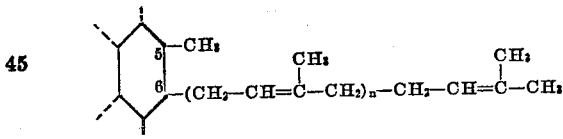

where $n=2$—6 - [3' - methyl - 2' - butenyl - bis(3' - methyl-2'-butenylene)].
where $n=3$—6 - [3' - methyl - 2' - butenyl - tris - (3'-methyl-2'-butenylene)]
where $n=4$—6 - [3' - methyl - 2' - butenyl - tetrakis - (3'-methyl-2'-butenylene)].
where $n=5$—6 - [3' - methyl - 2' - butenyl - pentakis- (3'-methyl-2'-butenylene)].
where $n=6$—6 - [3' - methyl - 2' - butenyl - hexakis - (3'-methyl-2'-butenylene)].
where $n=7$—6 - [3' - methyl - 2' - butenyl - hepatakis- (3'-methyl-2'-butenylene)].
where $n=8$—6 - [3'-methyl-2'-butenyl - octakis - (3'-methyl-2'-butenylene)].
where $n=9$—6 - [3' - methyl - 2' - butenyl - enakis - (3'-methyl-2'-butylene)].

EXAMPLE 1

*1,4-diphosphate of 1,4-dihydroxy-3,4-dimethoxy-5-methyl - 6 - [3' - methyl - 2' - butenyl - enakis - (3' - methyl-2' - butenylene)] - benzene*

REDUCTION WITH SODIUM HYDROSULFITE (STEP A)

A solution of 1.0 g. of the yellow-orange quinone form of Coenzyme Q-10 in 10 ml. of ethanol and 10 ml. of ether was treated with a solution of 4 g. of sodium hydrosulfite in approximately 40 ml. of water by gradual addition with agitation. The solution was kept in an inert atmosphere by adding small pieces of Dry Ice as required. This was also done during the following isolation procedure. The ether layer was increased to approximately 30 ml. The water layer was separated and further extracted 3 times more with equal volumes of ether. The ether extracts were washed with saturated salt solution, dried over anhydrous magnesium sulfate, filtered, and the filtrate was concentrated to a residue, wt. 1.0 g., which crystallized after pumping free of solvent. This hydroquinone of Coenzyme Q–10 (or 1,4-dihydroxy-2,3-dimethoxy - 5 - methyl - 6 - [3' - methyl - 2' - butenyl - enakis-(3'-methyl-2'-butenylene)]-benzene) was phosphorylated as in Step B. (It is convenient to merely evaporate under vacuum a known aliquot of this product in solution in the flask prepared for the next reaction.)

PHOSPHORYLATION WITH PHOSPHORUS OXYCHLORIDE (STEP B)

An aliquot of the hydroquinone of Coenzyme Q–10 (prepared as in Step A) weighing 94 mg. was azeotropically distilled with benzene in a 3-necked flask provided with stirrer, addition funnel, inlet for purified nitrogen, and condenser for distillation, until nearly all the benzene was removed. (The entire preparation was carried out under dry, purified nitrogen gas.) Ten ml. of dry pyridine was added; the solution was cooled to −15° C. (bath temp.) and, with stirring, a solution of 0.5 ml. of freshly redistilled phosphorus oxychloride in 5 ml. of dry pyridine was added during ten minutes. Stirring and cooling were continued for about one-quarter hour more; then the mixture was stirred at room temperature for two hours. A warm bath (approximately 50° C.) and vacuum were applied and all excess solvents and reagents were removed by distillation into cold traps until a mushy, partly crystalline residue had formed. This was treated (under purified nitrogen) with about 50 ml. of ether, and the stirred suspension was poured onto crushed ice. The water layer was separated and extracted twice more with equal volumes of ether. The combined ethereal layers were washed with dilute (1 part concd.: 2 parts water) hydrochloric acid, filtered through a dry paper and evaporated. Concentration of the residue yielded 102 mg. of the crude 1,4-diphosphate of 1,4-dihydroxy-2,3-dimethoxy - 5 - methyl - 6 - [3' - methyl - 2' - butenyl - enakis-(3'-methyl-2'-butenylene)]-benzene.

If it is desired to investigate the components in the crude phosphate preparation from this or any procedure, the presence of one or several components may be recognized by paper chromatography, using the methods of Hanes and Isherwood [Nature 164, 1107 (1949) and Bandurski and Axelrod, J. Biol. Chem. 193, 405 (1951)] for demonstration of organically bound phosphate spots.

The presence of several spots due to organically bound phosphate shows the presence of the 1- and 4-monophosphates of the hydroquinone named above.

If it is desired to produce a greater proportion of these 1- and 4-monophosphate derivatives, the requisite hydroquinone may be treated with smaller relative amounts of phosphorous oxychloride, using the same procedure as given above.

Further purification of the 1,4-diphosphate was carried out by taking up the crude material in N sodium hydroxide and ether (serious emulsification may occur; washing is best done with gentle swirling of the solvent layers); the water layer was then again washed with ether, acidified with excess concentrated hydrochloric acid, and extracted with ether several times. The combined etheral extracts were washed with dilute hydrochloric acid and water and filtered through a dry paper. Concentration of the filtrate and pumping of the residue yields the strongly acid diphosphate of 1,4-dihydroxy-2,3-dimethoxy-5-methyl-6-[3' - methyl-2'-butenyl-enakis (3'-methyl-2'-butenylene)]-benzene.

EXAMPLE 2

Diphosphate of 1,4-dihydroxy-2,3-dimethoxy-5-methyl-6-(3',7'-dimethyl-2',6'-octadienyl)-benzene By employing as starting material the 2,3-dimethoxy-5-methyl-6-geranylhydroquinone which is described in the above-mentioned Shunk et al. application referred to above, and applying the phosphorylating conditions of Step B described in Example 1, there is obtained the crude diphosphate of 1,4-dihydroxy-2,3-dimethoxy-5-methyl-6-(3',7'-dimethyl-2',6'-octadienyl)-benzene as a slightly colored, highly acid solid. By neutralization with the theoretical quantities of potassium hydroxide, this may be converted to the dipotassium salt or the tetrapotassium salt, or similarly, to other alkali or alkaline earth salts.

EXAMPLE 3

Diphosphate of 1,4-dihydroxy-2,3-dimethoxy-5-methyl-6-[3'-methyl - 2' - butenyl-bis-(3'-methyl-2'-butenylene)]-benzene By employing as starting material the 1,4-dihydroxy-2,3-dimethoxy - 5 - methyl-6-[3'-methyl-2'-butenyl-bis-(3'-methyl -2 '- butenylene)]-benzene (which may be named as 2,3-dimethoxy-5-methyl-6-farnesyl-hydroquinone as in the co-pending application referred to above) and applying the conditions of Step B as in Example 1, there is obtained, by application of the isolation procedure illustrated above, the crude 1,4-diphosphate of 1,4-dihydroxy - 2,3 - dimethoxy-5-methyl-6-[3'-methyl-2'-butenyl-bis-(3'-methyl-2'-butenylene)]-benzene as in acid gummy residue; this may be converted to its calcium salt by neutralization with the calculated quantity of pure calcium carbonate, or similarly, to other alkali or alkaline earth salts.

EXAMPLE 4

1,4-diphosphate of 1,4-dihydroxy-5-methyl-6-[3'-methyl-2'-butenyl-tetrakis-(3'-methyl-2'-butenylene)]-benzene The conditions of Step B can be applied to 2,3-dimethoxy-5-methyl - 6 - (3',7',11',15',19'-pentamethyl-2',6',10', 14',18'-eicosapentaenyl)-hydroquinone, prepared as in the Shunk et al. application mentioned above (this starting compound may also be named 1,4-dihydroxy-2,3-dimethoxy - 5 - methyl - 6 - [3'-methyl-3'-butenyl-tetrakis-(3'-methyl-2'-butenylene)]-benzene). When the reaction mixture is worked up by the procedure described in Example 1, there is obtained the crude 1,4-diphosphate of 1,4-dihydroxy - 2,3 - dimethoxy-5-methyl-6-[3'-methyl-2'-butenyl-tetrakis-(3'-methyl - 2' - butenylene)]-benzene as a slightly yellow acid solid, which may be converted to its magnesium salt by treatment with the calculated quantity of pure magnesium hydroxide solution and evaporation. It will be apparent that by strictly similar techniques of neutralization with the requisite alkali; any of the alkali or alkaline earth salts may be prepared.

EXAMPLE 5

1,4-diphosphate of 1,4-dihydroxy-2,3-dimethoxy-5-methyl-6-[3'-methyl-2'-butenyl - heptakis - (3' - methyl-2'-butenylene)]-benzene The 2,3 - dimethoxy-5-methyl-6-[3'-methyl-2'-butenyl-heptakis - (3' - methyl - 2' - butenylene)]-hydroquinone, whether it be obtained from living sources as the quinone and reduced as in Step A, or produced synthetically as in the co-pending Shunk et al. application referred to above [wherein it is named as 2,3-dimethoxy-5-methyl-6 - (3',7',11',15',19',23',27',31' - octamethyl-2',6',10',14', 18'22',26',30'-dotriacontaoctaenyl) - hydroquinone] may be employed as the starting hydroquinone for Step B; after application of the method of Example 1 there is obtained the 1,4-diphosphate of 1,4-dihydroxy-2,3-dimethoxy - 5 - methyl - 6 - [3'-methyl-2'-butentyl-heptakis-(3'-methyl-2'-butenylene)]-benzene. By the procedures of Examples 1, 2, 3, and 4, alkali or alkaline earth salts are produced.

In the above examples, the ammonium salt of the phosphates may be obtained, by adding ammonium hydroxide, for example.

What is claimed is:
1. The compounds:

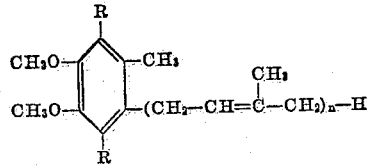

in which R is selected from the group consisting of orthophosphate and hydroxyl, at least one of them being orthophosphate, and $n$ is an integer from one to ten.

2. 1,4-diphosphate of 1,4-dihydroxy-3,4-dimethoxy-5-methyl - 6 - [3'-methyl-2'-butenyl-enakis-(3'-methyl-2'-butenylene)] benzene.

3. Diphosphate of 1,4-dihydroxy - 2,3 - dimethoxy-5-methyl-6-(3',7'-dimethyl-2',6'-octadienyl)-benzene.

4. Diphosphate of 1,4-dihydroxy - 2,3 - dimethoxy-5-methyl - 6 - [3'-methyl-2'-butenyl-bis-(3'-methyl-2'-butenylene)]-benzene.

5. 1,4-diphosphate of 1,4-dihydroxy - 5 - methyl-6-[3'-methyl - 2' - butenyl-tetrakis-(3'-methyl-2'-butenylene)]-benzene.

6. 1,4-diphosphate of 1,4-dihydroxy-2,3-dimethoxy-5-methyl - 6 - [3'-methyl-2'-butenyl-heptakis-(3'-methyl-2'-butenylene)]-benzene.

References Cited in the file of this patent
UNITED STATES PATENTS
2,380,716  Baker _____ July 31, 1945

FOREIGN PATENTS
547,764  Great Britain _____ Sept. 10, 1942

OTHER REFERENCES
Crane et al.: Biochim. Biophys. Acta, 25, 220 (1957).